United States Patent Office 3,422,108
Patented Jan. 14, 1969

3,422,108
PREPARATION OF SUBSTITUTED-2-4 DIOXOHEXAHYDROPYRIMIDINES
Phillip Adams, Murray Hill, and Benedict Juliano, Elizabeth, N.J., assignors to Millmaster Chemical Corporation, New York, N.Y., a corporation of Delaware
No Drawing. Continuation-in-part of application Ser. No. 389,460, Aug. 13, 1964. This application Jan. 15, 1968, Ser. No. 697,606
U.S. Cl. 260—260    7 Claims
Int. Cl. C07d 51/36

ABSTRACT OF THE DISCLOSURE

Substituted-2-4 dioxohexahydropyrimidines are prepared by reacting a carbamic acid ester with a beta amino ester in the presence of a Lewis acid catalyst at a temperature in the range of about 70 to 200° C. Thus, 1-benzyl-3-cyclohexyl - 2,4 - dioxohexahydropyrimidine is prepared by the reaction of methyl-β-benzylaminopropionate and methyl N-cyclohexyl carbamate utilizing dibutyl tin oxide as the catalyst.

---

This application is a continuation-in-part of Ser. No. 389,460, filed Aug. 13, 1964 and now abandoned.

BACKGROUND OF THE INVENTION

Substituted-2-4 dioxohexahydropyrimidines find increasing use as pharmaceuticals, see e.g., U.S. Patent No. 3,124,580.

Conventional methods of preparation present problems such as process economics, including raw materials, and product work up.

SUMMARY OF THE INVENTION

It has now been found that substituted-2-4 dioxohexahydropyrimidines having the formula $$\begin{array}{c} R^1 \\ | \\ N \\ CH_2 \diagup \quad \diagdown C=O \\ | \qquad\qquad | \\ CH_2 \qquad N-R^3 \\ \diagdown C \diagup \\ \| \\ O \end{array}$$

I can be prepared by reacting a carbamic acid ester having the formula $$R^3NHCOOR^4$$
II with a beta-aminoester having the formula $$HNR^1(CH_2)_2COOR^2$$
III wherein $R^1$ and $R^3$ are radicals selected from the group consisting of alkyl radicals having from 1 to 22 carbon atoms, aryl, alkaryl, aralkyl, alicyclic radicals having no more than 10 carbon atoms, and H radicals; and $R^2$ and $R^4$ are alkyl radicals whose alkanol is lower boiling than the carbamic acid ester. Further details are supplied below.

The ring closure of the nature presented has not been previously reported.

DESCRIPTION OF THE PREFERRED EMBODIMENTS

The equation for the reaction is illustrated below.

$$R^1NHCH_2CH_2CO_2CH_3 + H_2NCO_2CH_3 \longrightarrow$$

$$\begin{array}{c} CH_2-CH_2 \\ R^1-N \diagup \qquad \diagdown C=O + 2CH_3OH \\ \diagdown C-N \diagup \\ \| \quad \| \\ O \quad H \end{array}$$

IV

The carbamic acid esters are readily available. Typical ones are shown in the examples and in Table I.

The beta-aminoesters are easily prepared, cf. U.S. Patent No. 2,886,594 and "Monomeric Acrylic Esters", Riddle, (1954), Chapter VI. Typical ones are also shown in the examples and in Table I.

The $R^2$ and $R^4$ radicals are alkyl radicals having from 1 to 12 carbon atoms with methyl and ethyl preferred. The $R^1$, $R^2$, $R^3$ and $R^4$ radicals can thus be the same or different.

In the case of the aminoesters, it is possible to change the number of the methylene groups and also by adding substituents thereon, to form further heterocyclic N rings.

The reactants are employed in about stoichiometric amounts. Temperatures in the range of about 70°–220° C., preferably 110°–150° C., are employed with pressures of atmospheric or less as required to maintain the temperature and alcohol evolution. In general, higher temperatures within the range are employed at the terminal portion of the reaction and when the indicated radicals are not H, i.e., $R^3$ radical.

Inert organic diluents such as, e.g., naphtha, xylene, and chlorobenzene, or none, can be employed. Excess of one reactant, preferably carbamic acid ester, can be used as the diluent.

A minor amount of a metal compound Lewis acid catalyst is employed such as dibutyl tin oxide, titanium tetrachloride, cupric acetate, stannic chloride, stannous oxalate, aluminum alkoxide, and alkyl tin oxides. The catalyst is used in an amount of from about 0.1–2 wt. percent based on aminoester.

This invention, product work up, and its advantages will be better understood by reference to the following examples.

EXAMPLE 1

Preparation of 1-cyclohexyl-2,4-dioxohexahydropyrimidine:

Methyl-β-cyclohexylaminopropionate (93 g., 0.5 mole) and methyl carbamate (42 g., 0.55 mole) were heated in xylene (25 ml.) in the presence of stannic chloride (2.0 g.) at 115°–130° C. and approximately 200 mm. pressure. Methanol formed from the reaction was distilled out over a period of four hours, at which time the reaction was complete. Two hundred ml. butanol were added, the mixture heated to solution, carbon treated and filtered. The product was crystallized, filtered and washed. There were obtained 47 g. (48% of theory) of 1-cyclohexyl-2,4-dioxohexahydropyrimidine.

EXAMPLE 2

Preparation of 1-benzyl-3-cyclohexyl-2,4-dioxohexahydropyrimidine:

Methyl-β-benzylaminopropionate (38 g., 0.2 mole) and methyl N-cyclohexyl carbamate (34.5 g., 0.22 mole) were heated in xylene (150 ml.) in the presence of dibutyl tin oxide (0.5 g.) at 150° C. for two hours, meanwhile distilling one-half of the theoretical methanol. The temperature was then raised to 210° C. by distillation of the xylene. Under these conditions, ring-closure occurred and the remaining methanol was removed. Xylene (150 ml.) was added and the mixture cooled and crystallized. There were obtained 18 g. (31%) of 1-benzyl-3-cyclohexyl-2,4-dioxohexahydropyrimidine.

Further experimental results are summarized in Table I. $R^2$ and $R^4$ were methyl except as indicated. The M.P.'s and analyses are reported for samples recrystallized once from xylene or butanol solvent. Similar results are obtained from other suitable solvents and catalysts.

TABLE I

| No. | $R_1$ | $R_3$ | Catalyst | Yield (percent of theory) | M.P. | Purity (percent) |
|---|---|---|---|---|---|---|
| 1 | Phenyl | H | $SnCl_4$ | 10 | 194.0–195.0 | 102.1 |
| 2 | β-Phenethyl | H | $Bu_2SnO$ | 60 | 119.7–121.7 | 100.4 |
| 3 | 3,4-dichloro-α-phenethyl | H | $SnCl_4$ | 80 | 159.5–160.0 | 100.4 |
| 4 | Butyl | H | $Bu_2SnO$ | 70 | 80.0–81.7 | 101.6 |
| 5 | Cyclohexyl | H | $SnCl_4$ | 48 | 183.0–185.0 | 100.2 |
| 6 | Benzyl | Cyclohexyl | $Bu_2SnO$ | 31 | 208.5–211.0 | 97.5 |
| 7 | do | Butyl | $Bu_2SnO$ | | | |
| 8 | do | Phenyl | $Bu_2SnO$ | 79 | 117.3–120.0 | 101.0 |
| 9 | do | H | $Bu_2SnO$ | 50 | 126.5–128.0 | 101.1 |
| 10* | do | H | $Bu_2SnO$ | 75 | 126.5–128.0 | |

*Used butyl carbamate.

These data show the operability of the claimed process with a variety of reagents. Yields can readily be improved by optimizing of conditions.

The advantages of this invention will be apparent to the skilled in the art. An economical process is made available for readily preparing the desired products with yields equal or better than previously possible.

It is to be understood that this invention is not limited to the specific examples which have been offered merely as illustrations, and that modifications can be made without departing from the spirit thereof.

What is claimed is:
1. A process for preparing a substituted-2,4 dioxyhexahydropyrimidine having the formula:

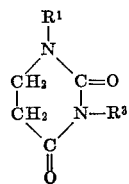

which comprises reacting a carbamic acid ester having the formula: $N^3NHCOOR^4$, with a beta-aminoester having the formula: $HNR^1(CH_2)_2COOR^2$, wherein $R^1$ and $R^3$ are radicals selected from the group consisting of alkyl radicals having up to four carbon atoms, phenyl β-phenyl, 3,4-dichloro-α-phenethyl, cyclohexyl and H radicals; and $R^2$ and $R^4$ are alkyl radicals, having from 1 to 12 carbon atoms, whose alkanol is lower boiling than the carbamic acid ester, in the presence of a Lewis acid catalyst selected from the group consisting of dibutyl tin oxide, titanium tetrachloride, cupric acetate, stannic chloride, stannous oxalate, aluminum alkoxide, and alkyl tin oxides, utilized in an amount of from 0.1 to 2.0 wt. percent based on aminoester, at a temperature in the range of about 70°–220° C. and recovering the substituted-2,4 dioxyhydropyrimidine.

2. The process of claim 1 in which the $R^1$ is benzyl, the $R^3$ is cyclohexyl and $R^2$ and $R^4$ are methyl.

3. The process of claim 1 in which the $R^1$ is β-phenethyl, the $R^3$ is H, and $R^2$ and $R^4$ are methyl.

4. The process of claim 1 in which the $R^1$ is butyl, the $R^3$ is H, and $R^2$ and $R^4$ are methyl.

5. The process of claim 1 in which the $R^1$ is 3,4 dichloro-α-phenethyl, the $R^3$ is H, and $R^2$ and $R^4$ are methyl.

6. The process of claim 1 in which the $R^1$ is benzyl, the $R^3$ is H, and $R^2$ and $R^4$ are methyl.

7. The process of claim 1 in which the $R^1$ is benzyl, the $R^3$ is phenyl, and $R^2$ and $R^4$ are methyl.

References Cited

UNITED STATES PATENTS 3,124,580   3/1964   Surrey et al. _____ 260—260

ALEX MAZEL, *Primary Examiner.*

ANNE MARIE TIGHE, *Assistant Examiner.*

UNITED STATES PATENT OFFICE
CERTIFICATE OF CORRECTION

Patent No. 3,422,108                                        January 14, 1969

Phillip Adams et al.

It is certified that error appears in the above identified patent and that said Letters Patent are hereby corrected as shown below:

Column 3, last line, the formula should appear as shown below:

$$R^3NHCOOR^4$$

Column 4, line 3, "β-phenyl" should -- β-phenethyl --.

Signed and sealed this 17th day of March 1970.

(SEAL)
Attest:

Edward M. Fletcher, Jr.                              WILLIAM E. SCHUYLER, JR.
Attesting Officer                                               Commissioner of Patents